US008780815B2

(12) United States Patent
Suga

(10) Patent No.: US 8,780,815 B2
(45) Date of Patent: Jul. 15, 2014

(54) WIRELESS RESOURCE ALLOCATION METHOD IN WIRELESS COMMUNICATION SYSTEM AND WIRELESS BASE STATION IN THE SAME

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1297 days.

(21) Appl. No.: 12/494,072

(22) Filed: Jun. 29, 2009

(65) Prior Publication Data

US 2009/0262698 A1    Oct. 22, 2009

Related U.S. Application Data

(63) Continuation of application No. PCT/JP2007/051715, filed on Feb. 1, 2007.

(51) Int. Cl.
*H04W 72/04* (2009.01)

(52) U.S. Cl.
USPC .......................................... 370/329; 370/444

(58) Field of Classification Search
USPC .......................................... 370/329; 455/561
See application file for complete search history.

(56) References Cited

U.S. PATENT DOCUMENTS

| 5,697,058 | A  | * | 12/1997 | Paavonen ...................... 455/509 |
| 2005/0157678 | A1 | * | 7/2005 | Mantha et al. ................. 370/329 |
| 2005/0207343 | A1 | * | 9/2005 | Han, II .......................... 370/235 |
| 2006/0203753 | A1 | * | 9/2006 | Toskala et al. ................. 370/278 |
| 2007/0195818 | A1 | * | 8/2007 | Stephenson et al. .......... 370/468 |
| 2008/0045272 | A1 | * | 2/2008 | Wang et al. .................... 455/561 |

FOREIGN PATENT DOCUMENTS

| EP | 1172766 | 1/2002 |
| EP | 1217852 | 6/2002 |
| JP | 2002368764 | 12/2002 |
| JP | 2003051761 | 2/2003 |
| JP | 2004153558 | 5/2004 |
| JP | 2006005653 | 1/2006 |

OTHER PUBLICATIONS

International Search Report dated May 15, 2007.

* cited by examiner

*Primary Examiner* — Donald Mills
*Assistant Examiner* — Henry Baron
(74) *Attorney, Agent, or Firm* — Smith, Gambrell & Russell, LLP

(57) ABSTRACT

A wireless base station monitors a state of reception in a common transmission region (channel) in a wireless frame common to a plurality of wireless terminals, and controls allocation of a transmission region in the wireless frame to be used for transmission by the wireless terminals on the basis of a result of the monitoring and information about priority set to each of the plural wireless terminals. The wireless resource can be preferentially allocated to a wireless terminal of a user having high priority even when the common communication region used to obtain permission to send a bandwidth request is congested.

21 Claims, 13 Drawing Sheets

FIG. 5

| MS | PRIORITY |
|---|---|
| MS30-1 | NORMAL |
| MS30-2 | HIGH |
| MS30-3 | HIGH |
| MS30-4 | NORMAL |
| MS30-5 | NORMAL |

FIG. 7

| MS | MCS (WIRELESS COMMUNICATION SCHEME) | PRIORITY |
|---|---|---|
| MS30-1 | 16QAM | NORMAL |
| MS30-2 | QPSK | LOW |
| MS30-3 | 64QAM | HIGH |
| MS30-4 | 64QAM | HIGH |
| MS30-5 | QPSK | LOW |

WIRELESS RESOURCE ALLOCATION METHOD IN WIRELESS COMMUNICATION SYSTEM AND WIRELESS BASE STATION IN THE SAME

CROSS-REFERENCE TO RELATED APPLICATION

This application is a continuation Application of a PCT international application No. PCT/JP2007/051715 filed on Feb. 1, 2007 in Japan, the entire contents of which are incorporated by reference.

TECHNICAL FIELD

The present invention relates to a wireless resource allocation method in a wireless communication system and a wireless base station in the same.

BACKGROUND ART

In a wireless communication system having a wireless base station (BS) and a wireless terminal (for example, a mobile station) (MS), the MS can communicate with another MS via the BS.

In such a wireless communication system, there is generally provided QoS (Quality of Service) that reserves a bandwidth for a specific communication and assures a certain transmission speed.

The QoS realizes a communication based on priority for each user according to information (contract information, etc.) about the user possessing the MS, for example. The Qos can provide communication of higher quality or wider bandwidth to a user having higher priority than a user having lower priority.

In a wireless communication system in conformity to IEEE802.16e standard such as WiMAX (Worldwide Interoperability for Microwave Access) based on OFDM (Orthogonal Frequency Division Multiplexing) (or OFDMA: Orthogonal Frequency Division Multiple Access) technique that has been researched and developed in these years, the MS transmits a specific signal called a CDMA code when opening a communication with a BS, and receives a response signal to the CDMA code from the BS which includes transmission permission to transmit an allocation request for a wireless resource (frequency bandwidth, spread code, etc.) for data transmission.

Now, an example of operation of the whole wireless communication system aforementioned will be described with reference to FIG. 12. FIG. 12 is a sequence diagram illustrating an operation at the time of start of a communication in the above wireless communication system.

Before starting a communication with the BS, the MS transmits a CDMA code to the BS in order to obtain a right to transmit an allocation request for the wireless resource (step S100).

When normally receiving the CDMA code from the MS, the BS determines whether to permit the MS to transmit the wireless allocation request. This determination operation is based on the state of vacancy of the wireless resource or the like, for example.

When determining to permit the MS to transmit the allocation request, the BS transmits a message (CDMA Allocation IE (Information Element)) signifying that the BS permits the MS to transmit the allocation request as a response signal to the CDMA code thereby gives a right of transmission of the wireless resource allocation request signal to the MS (step S110).

When receiving the response signal, the MS transmits, to the BS, a wireless resource allocation request signal (Bandwidth Request) for the uplink (UL) communication (step S120).

When receiving the allocation request signal, the BS determines whether to allocate the requested wireless resource to the MS. This determination operation is based on the state of vacancy of the wireless resource or the like, for example.

When determining to allocate the wireless resource requested by the allocation request signal, the BS allocates the wireless resource requested by the allocation request signal to the MS, and transmits an allocation permission signal (UL Allocation) to the MS (step S130).

The MS finally receives the allocation permission signal, thereby initiating transmission in the UL (data transmission in the UL) with the use of the wireless resource allocated by the BS (step S140).

In the above wireless communication system, the MS needs that the BS accepts the CDMA code in order to transmit data to the BS, as stated above.

Now, a wireless frame used for transmission of the CDMA code will be described with reference to FIG. 13. FIG. 13 is a schematic diagram illustrating an example of wireless frame used in the above wireless communication system. This wireless frame is in conformity with the OFDM (or OFDMA) system, in particular, IEEE802.16e standard, used in WiMAX.

As illustrated in FIG. 13, the wireless frame is configured with a downlink (DL) subframe and an uplink (UL) subframe having a plurality of frequency channels (in the vertical direction on the paper) which are time-division-multiplexed (in the horizontal direction on the paper).

In the downlink subframe, there are defined a preamble field (region) 100 into which synchronization information on the wireless frame is inserted, a header region including FCH field into which a frame control header (FCH) is inserted, MAP information field into which MAP information (DL-MAP, UL-MAP) including allocation information on a burst region (defined by the frequency and symbol time) used for the communication by the MS is inserted, and another region (burst region).

On the other hand, the uplink subframe has a CDMA band width request region 200 and an other region (burst region, transmission region for MSs). The CDMA code is transmitted from the MS to the BS with the use of the CDMA bandwidth request region 200. Namely, the CDMA bandwidth request region 200 is defined as a region (common transmission region, common channel) common to a plurality of MSs.

Since the CDMA bandwidth request region 200 is common to a plurality of MSs (that is, MSs connecting to the BS) having been subjected to the negotiation process (user authentication process, etc.) required when the MS receives data from the BS, each of the plural MSs randomly selects one of plural CDMA codes, and transmits the CDMA code at a random frequency and timing (symbol time) with the use of the CDMA bandwidth request region 200.

When plural MSs transmit the identical CDMA codes to the BS at the same frequency and timing (symbol time) in the CDMA bandwidth request region 200, collision of the CDMA codes occurs, which prevents the BS from normally receiving the CDMA codes from the plural MSs.

As a result, the MS cannot receive a response signal (CDMA Allocation IE message) from the BS. Further, when the MS cannot receive the response signal from the BS within a predetermined period of time, the MS determines that the BS was not able to normally receive the CDMA code, and performs a control to select a CDMA code and re-transmit the CDMA code.

In the meantime, there are patent documents 1 to 3 as the related techniques. The technique disclosed in the patent document 1 defines two types of access control fields of CFP (Contention Free Period) and CP (Contention Period) in a wireless LAN (Local Area Network), and uses either CFP or CP according to a parameter for securing the minimum value of the CP in order to secure a constant CP at any time.

The technique disclosed in patent document 2 defines access control fields for CFP and CP so as to attain efficient use of the wireless resource and a wireless access control method applicable to multi hop communication. The technique disclosed in patent document 3 defines a contention mode and a poling mode in a communication system having a wire transmission path, and allocates an idle channel.

Patent Document 1: Japanese Laid-open Patent Publication No. 2004-153558

Patent Document 2: Japanese Laid-open Patent Publication No. 2006-5653

Patent Document 3: Japanese Laid-open Patent Publication No. 2002-368764

DISCLOSURE OF THE INVENTION

Issues to be Solved by the Invention

When users of MSs are in a crowded place or a disaster occurs, it could happen that the MSs connecting to the BS simultaneously start communications. In such case, CDMA codes transmitted from the plural MSs could collide, which prevents the BS from transmitting response signals with respect to wireless resource allocation requests responsive to the CDMA codes having collided.

In such situation, there could be users who have high priority among users of the MSs having transmitted the colliding CDMA codes. However, it could take a time to allocate the wireless resource to such a user although his/her priority is higher than those of the others, which delays the start of the communication.

On the other hand, when the BS can normally receive a lot of CDMA codes although a lot of MSs simultaneously have started communications, the BS transmits response signals to the lots of received CDMA codes. However, there is possibility that the BS cannot transmit (respond) the response signal to all the CDMA codes received from the MSs because the wireless resource is limited.

Since the CDMA code does not include information about the MS (user identification information or the like), the BS cannot discriminate which MS has transmitted the CDMA code at the point of time that the BS receives the CDMA code from the MS.

As a result, the BS cannot preferentially transmit the response signal to the MS of a user having higher priority, hence it takes a time to allocate the wireless resource to the user and the start of communication is delayed although the user has higher priority than the others.

The above patent documents 1 to 3 neither disclose nor suggest the above problems and solutions to the problems.

In the light of the above problems, an object of the present invention is to enable a user having higher priority to be preferentially allocated the wireless resource (communication region) even in a situation where a plurality of wireless terminals simultaneously start communications, and hence the common region in the wireless frame transmitted to the wireless base station is congested.

Means to Solve the Issues

To attain the above object, the present invention provides a wireless resource allocation method in a wireless communication system and a wireless base station in the same, as follows.

(1) According to an aspect of the present invention, a wireless resource allocation method in a wireless communication system having a plurality of wireless terminals and at least one wireless base station communicating with the plural wireless terminals, where the plural wireless terminals each transmits a specific signal for obtaining a right to transmit a request for wireless resource allocation to the wireless base station and the wireless base station allocates the wireless resource to the wireless terminal in response to the specific signal, the wireless resource allocation method includes: at the wireless base station, monitoring a state of reception of the specific signals from the plural wireless terminals; determining whether to execute the wireless resource allocation based on priority beforehand set to each of the plural wireless terminals according to a result of the monitoring; and executing the wireless resource allocation based on the priority when the wireless resource allocation based on the priority is determined to be executed.

(2) The wireless base station may monitor the number of the specific signals received at a specific frequency and for a specific period of time, and may determine whether to execute the wireless resource allocation based on the priority according to the number of the received specific signals.

(3) Alternatively, the wireless base station may monitor the number of collisions of the specific signals received at a specific frequency and for a specific period of time, and may determine whether to execute the wireless resource allocation based on the priority according to the number of collisions of the specific signals.

(4) Still alternatively, the wireless base station may determine whether to execute the wireless resource allocation based on the priority according to the number of the received specific signals and the number of response signals to the specific signals that the wireless base station can transmit.

(5) Still alternatively, the wireless base station may determine whether to execute the wireless resource allocation based on the priority according to the number of the specific signals received in the past, the number of response signals to the specific signals that the wireless base station was able to transmit in the past and the number of collisions of the specific signals in the past.

(6) The priority may be based on a contract level of a user possessing each of the wireless terminals.

(7) Alternatively, the priority may be based on a wireless communication scheme between the wireless base station and each of the wireless terminals.

(8) On this occasion, the wireless communication scheme may be based on one or more of modulation system, coding system and coding rate.

(9) The wireless base station may allocate the wireless resource of an amount to be used by a wireless terminal to transmit a wireless resource allocation request to the wireless base station.

(10) Alternatively, the wireless base station may allocate the wireless resource of an amount to be used by a wireless terminal to transmit a message for establishing a connection to the wireless base station.

(11) The wireless base station may not allocate the wireless resource based on the priority to a wireless terminal currently communicating with the wireless base station.

(12) According to another feature of the present invention, a wireless base station in a wireless communication system having a plurality of wireless terminals and at least one wireless base station, where the plural wireless terminals each transmits a specific signal for obtaining a right to transmit a request for wireless resource allocation to the wireless base station and the wireless base station allocates the wireless resource to the wireless terminal in response to the specific signal, the wireless base station comprises: a specific signal receiver that receives the specific signals from the plural wireless terminals; a monitor that monitors a state of reception of the specific signals received by the specific signal receiver; a determiner that determines according to a result of monitoring by the monitor whether to execute the wireless resource allocation based on priority beforehand set to each of the plural wireless terminals; and an allocator that allocates the wireless resource based on the priority when the determiner determines to execute the wireless resource allocation based on the priority.

(13) The monitor may monitor the number of the specific signals received at a specific frequency and for a specific period of time; and the determiner may determine whether to execute the wireless resource allocation based on the priority according to the number of the received specific signals.

(14) Alternatively, the monitor may monitor the number of collisions of the specific signals received at a specific frequency and for a specific period of time; and the determiner may determine whether to execute the wireless resource allocation based on the priority according to the number of collisions of the received specific signals.

(15) Still alternatively, the determiner may determine whether to execute the wireless resource allocation based on the priority according to the number of the received specific signals and the number of response signals to the specific signals that the wireless base station can transmit.

(16) Still alternatively, the determiner may determine whether to execute the wireless resource allocation based on the priority according to the number of the specific signals received in the past, the number of response signals to the specific signals that the wireless base station was able to transmit in the past and the number of collisions of the specific signals in the past.

(17) The wireless base station may further comprise: a priority decider that decides the priority based on information about each of the wireless terminals.

(18) The priority decider may decide the priority based on a contract level of a user possessing each of the wireless terminals.

(19) Alternatively, the priority decider may decide the priority based on a wireless communication scheme between the wireless base station and each of the wireless terminals.

(20) On this occasion, the wireless communication scheme may be based on one or more of modulation system, coding system and coding rate.

(21) The allocator may allocate to a wireless terminal the wireless resource of an amount to be used to transmit a wireless resource allocation request from the wireless terminal to the wireless base station.

(22) Alternatively, the allocator may allocate to a wireless terminal the wireless resource of an amount to be used to transmit a message for establishing a connection between the wireless base station and the wireless terminal.

(23) The allocator may not allocate the wireless resource based on the priority to a wireless terminal currently communicating with the wireless base station.

(24) According to still another feature of the present invention, a wireless resource allocation method in a wireless communication system having a plurality of wireless terminals and at least one wireless base station communicating with the plural wireless terminals by using a wireless frame, the wireless resource allocation method includes: at the wireless base station, monitoring a state of reception in a common transmission region in the wireless frame common to the plural wireless terminals; and controlling allocation of a transmission region in the wireless frame to be used for transmission by each of the wireless terminals based on a result of the monitoring of reception and information about priority set to each of the plural wireless terminals.

(25) According to still another feature of the present invention, a wireless base station in a wireless communication system having a plurality of wireless terminals and at least one wireless base station communicating with the plural wireless terminals using a wireless frame, the wireless base station comprises: a monitor that monitors a state of reception in a common transmission region in the wireless frame common to the plural wireless terminals; a priority information storing unit that stores information about priority set to each of the plural wireless terminals; and a controller that controls allocation of a transmission region in the wireless frame used for transmission by the wireless terminals based on a result of the monitoring of reception by the monitor and the information about priority in the priority information storing unit.

Effects of the Invention

The present invention provides at least the following effects or advantages:

(1) The wireless base station monitors a state of reception of specific signals from plural wireless terminals, determines whether to execute wireless resource allocation based on priority beforehand set to each of the plural wireless terminals, and executes the wireless resource allocation based on the priority when determining to execute the wireless resource allocation based on the priority. Therefore, the wireless base station can preferentially allocate the wireless resource to a wireless terminal having a high priority even when not being able to receive (discriminate) the specific signal.

(2) On such occasion, the wireless base station can execute the wireless resource allocation based on the priority according to a state of congestion of the communication between the wireless base station and the wireless terminal, by monitoring the number of the specific signals. Therefore, the wireless base station can execute the wireless resource allocation more effectively.

(3) The wireless base station can execute the wireless resource allocation based on the priority according to a state of congestion of a communication between the wireless base station and the wireless terminal, by monitoring the number of collisions of the specific signals. Therefore, the wireless base station can execute the wireless resource allocation more effectively.

(4) The wireless base station can execute the wireless resource allocation based on the priority according to the number of the specific signals and the number of response signals to the specific signals that the wireless base station can transmit. Therefore, the wireless base station can execute the wireless resource allocation more effectively.

(5) The priority is set on the basis of a contract level of a user possessing the wireless terminal. This makes it possible to preferentially allocate the wireless resource to a user having a higher contract level.

(6) The priority is set on the basis of a wireless communication scheme between the wireless base station and the wireless terminal. This makes it possible to preferentially allocate the wireless resource to a wireless terminal using a wireless communication scheme of higher efficiency.

Accordingly, the wireless resource can be allocated to more wireless terminals.

(7) The wireless base station allocates the wireless resource of an amount to be used to transmit a wireless resource allocation request from the wireless terminal to the wireless base station.

Therefore, this makes it possible to execute the wireless resource allocation more efficiently when the state of communication between the wireless base station and the wireless terminal is congested.

(8) The wireless base station allocates the wireless resource of an amount to be used to transmit a message for establishing a connection between the wireless base station and the wireless terminal.

Therefore, this makes it possible to execute the wireless resource allocation more efficiently when the state of communication between the wireless base station and the wireless terminal is congested.

(9) The wireless base station does not allocate the wireless resource to a wireless terminal currently communicating with the wireless base station. Therefore, this makes it possible to efficiently allocate the wireless resource to more wireless terminals.

BRIEF DESCRIPTION OF THE DRAWINGS

FIG. 5 is a diagram illustrating an example of priority table generated by the controller depicted in FIG. 2;

FIG. 7 is a diagram illustrating an example of the priority table generated by the controller depicted in FIG. 2;

DESCRIPTION OF REFERENCE CHARACTERS

Figure 1:
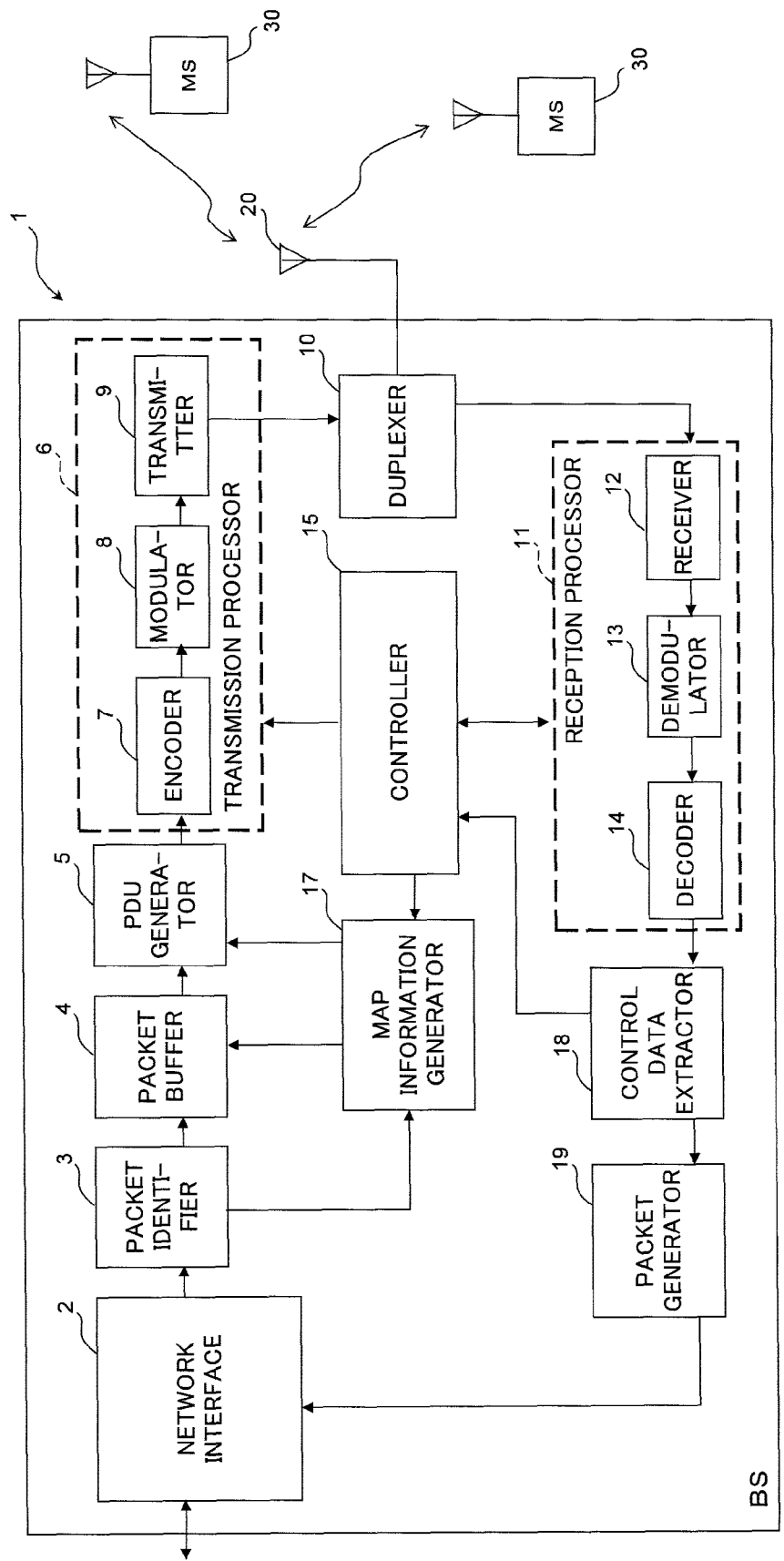
FIG. 1 is a block diagram illustrating configuration of essential parts of a wireless base station (BS) in a wireless communication system according to an embodiment of this invention.

1 . . . wireless base station (BS)
2 . . . NW (network) interface
3 . . . packet identifier
4 . . . packet buffer
5 . . . PDU generator
6 . . . transmission processor
7 . . . encoder
8 . . . modulator
9 . . . transmitter
10 . . . duplexer
11 . . . reception processor
12 . . . receiver
13 . . . demodulator
14 . . . decoder
15 . . . controller
16 . . . storing unit (priority information storing unit)
17 . . . MAP information generator
18 . . . control data extractor
19 . . . packet generator
20 . . . antenna
21 . . . specific signal receiver (specific signal receiver)
22 . . . monitor (monitor)
23 . . . determiner (determiner)
24 . . . priority decider (priority decider)
25 . . . allocator (allocator)
26 . . . response signal transmitter

BEST MODE FOR CARRYING OUT THE INVENTION

Hereinafter, description will be made of embodiments of the present invention with reference to the drawings. Note that the present invention is not limited to embodiments and modifications to be described hereinafter, but modification may be made in various ways without departing from the spirit and scope of the invention.

[A] Description of Embodiment

Figure 13:
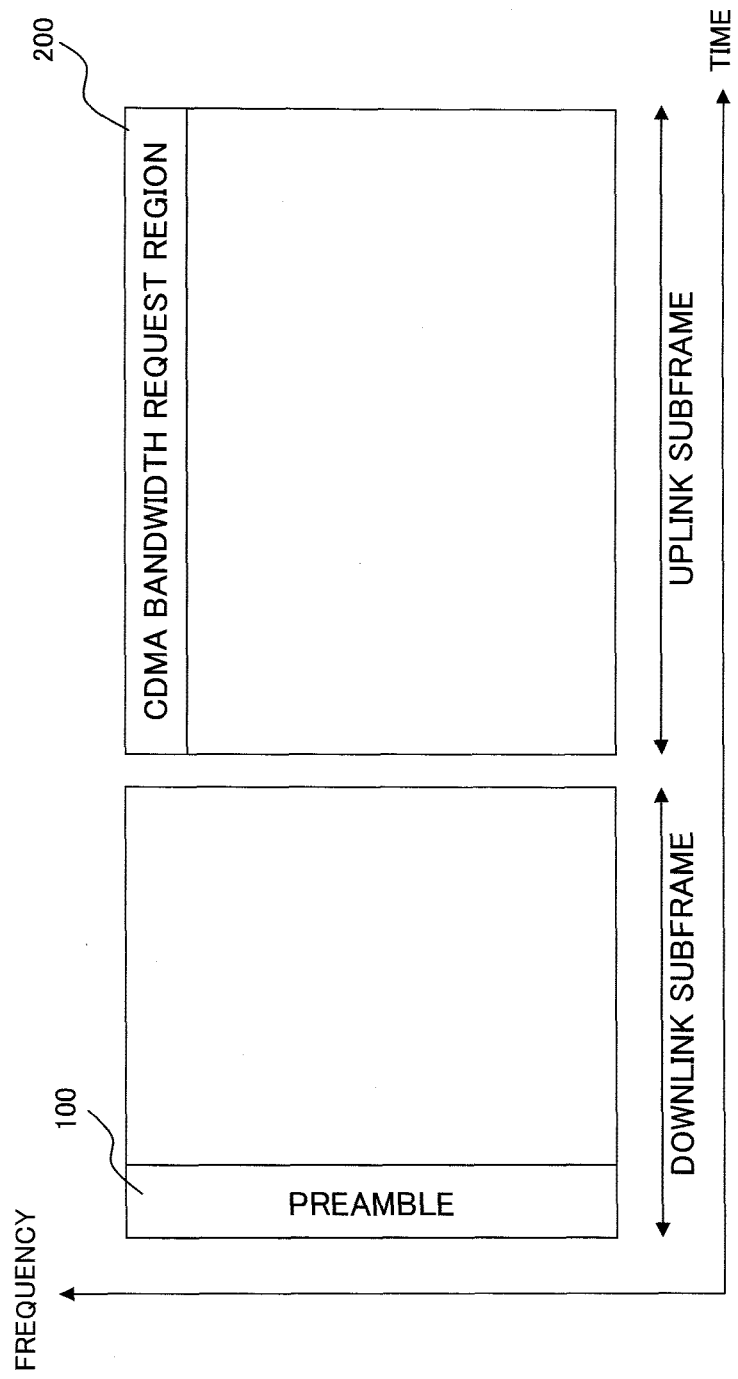
FIG. 13 is a schematic diagram illustrating an example of wireless frame used in known wireless communication systems.

FIG. 1 is a block diagram illustrating a configuration of essential part of a wireless base station (BS) in a wireless communication system according to an embodiment of this invention. The BS 1 illustrated in FIG. 1 communicates with a plurality of wireless terminals (MS) 30 by radio. A wireless frame used in this wireless communication is premised on a wireless frame in conformity to IEEE802.16e standard aforementioned with reference to FIG. 13, for example.

The MS 30 transmits, to the BS1, a specific signal (CDMA code) for obtaining a right to transmit a request for wireless resource allocation, that is, a request for allocation of a transmission region (UL burst) in the UL subframe defined by frequency (subchannel frequency) and time (symbol time) in the wireless frame, with the use of a specific region (CDMA bandwidth request region) which is shared by other MSs 30 in the UL subframe. The BS1 normally receives the CDMA code, thereby to allocate the wireless resource (UL burst) to the MS 30.

In the following description, packet signifies MAC-SDU (Media Access Control-Service Data Unit) (hereinafter, simply referred to as SDU) such as IP (Internet Protocol) packet, ATM (Asynchronous Transfer Mode) cell or the like, and MAC-SDU (payload portion) given thereto header information such as GMH (Generic MAC Header), subheader and the like is called MAC-PDU (MAC-Protocol Data Unit) (or simply referred to as PDU). PDU is a unit of data handled by protocol of the packet.

(Explanation of BS1)

In more detail, the BS 1 illustrated in FIG. 1 comprises a network interface 2, a packet identifier 3, a packet buffer 4, a PDU generator 5, a transmission processor 6, a duplexer 10, a reception processor 11, a controller 15, a MAP information generator 17, a control data extractor 18, a packet generator 19 and an antenna 20, when attention is paid to functions of essential parts of the BS 1.

The network (NW) interface 2 has a function of interfacing with an upper network (not illustrated) such as an IP network, an ATM network or the like, hence is provided with various kinds of protocol control functions, etc.

The packet identifier 3 identifies a destination MS 30, a QoS (Quality of Service) class and the like on the basis of information such as IP header and the like of transmission data (packet in this example) from the NW interface unit 2, transfers the identification information to the MAP information generator 17 while transferring the packet to the packet buffer 4.

The MAP information generator 1 generates allocation information (DL-MAP) indicating which region (burst) in the wireless frame the packet is to be mapped in (allocated to) for each connection ID (CID) corresponding to the destination MS 30 or the QoS class on the basis of the identification information from the packet identifier 3 under control of the controller 15, while generating allocation information (UL-MAP) designating a burst in the UL subframe to be used for a communication of the MS 30 with the BS 1.

MAP information is used for communication (transmission/reception) control between the BS 1 and the MS 30. The MS 30 communicates (transmits/receives) with the BS 1 by using a burst specified by CID, burst position, burst size set in the MAP information in a DL subframe received from the BS 1. Accordingly, the CDMA bandwidth request region in the UL subframe is designated by the MAP information, hence the wireless resource allocation process in this embodiment is reflected on the MAP information. Incidentally, the burst position can be designated by a subchannel offset and a symbol offset from the head of the wireless frame, whereas the burst size can be designated by a subchannel number and a symbol number.

The packet buffer 4 has a function of holding (buffering) the transmission packet from the packet identifier 3. The packet buffer 4 can transfer the transmission packet to the PDU generator 5 in the following stage for each connection ID (CID) corresponding to the destination MS 30 or the QoS class, for example, on the basis of the MAP information from the MAP information generator 17.

The PDU generator 5 generates a PDU on the basis of the transmission packet (SDU) and the MAP information from the packet buffer 4.

The transmission processor 6 performs various transmission processes such as encoding, modulation, etc. on the PDU from the PDU generator 5. For this purpose, the transmission processor 6 comprises an encoder 7, a modulator 8 and a transmitter 9.

The encoder 7 encodes the PDU from the PDU generator 5 into a predetermined code (for example, error correction code such as convolution code, turbo code, etc.). The modulator 8 modulates the modulation data from the encoder 7 in a predetermined modulation scheme such as QPSK (Quadrature Phase Shift Keying), 16 QAM (Quadrature Amplitude Modulation), 64 QAM, or the like. The coding rate in the encoder 7 and the modulation scheme in the modulator 8 can be adaptively controlled by the controller 15 on the basis of feedback information about reception quality of the MS 30 such as CQI (Channel Quality Indicator), CINR (Carrier to Interference and Noise Ratio), etc. Namely, AMC (Adaptive Modulation and Coding) control is applicable to the controller 15. In such case, information (AMC information) about the modulation scheme, coding scheme, and the coding rate can be included in the MAP information (DL-MAP) and transmitted.

The transmitter 9 performs wireless transmission processes including D/A conversion, frequency conversion (up-conversion) to the radio frequency (RF), high-output amplification to a transmission power on the transmission data encoded and modulated by the encoder 7 and the modulator 8.

The duplexer 10 has a function of switching between transmission/reception of the antenna 20 (separating transmission/reception signal). For example, the duplexer 10 outputs a transmission signal from the transmitter 9 to the antenna 20, while outputting a signal received by the antenna 20 to the reception processor 11.

The antenna 20 radiates the transmission signal (RF signal) from the transmitter 9 toward the MS 30, while receiving an RF signal transmitted from the MS 30.

The reception processor 11 performs various reception processes such as demodulation, decoding and the like on a signal received via the antenna 20 and the duplexer 10 from the MS 30. For this purpose, the reception processor 11 comprises a receiver 12, a demodulator 13 and a decoder 14, for example.

The receiver 12 performs wireless reception processes such as amplification by a low-noise amplifier, frequency conversion to the baseband frequency (down conversion), bandwidth limitation, A/D conversion, etc. on a reception signal received via the duplexer 10 from the MS 30. The demodulator 13 demodulates the reception signal sent from the receiver 12 in a demodulation scheme corresponding to the modulation scheme decided by the controller 15. The decoder 14 decodes the reception data demodulated by the demodulator 13 in a decoding scheme corresponding to an encoding scheme decided by the controller 15.

The control data extractor 18 discriminates whether the reception data having been subjected to the reception processes by the reception processor 11 is control data (MAC management message) or user data, and transfers the control data to the controller 15, while transferring the user data to the packet generator 19. In this embodiment, the control data extractor 18 can extract a CDMA code that is a specific signal (control data) in the CDMA bandwidth request region in the UL subframe from the reception data, and can transfer the CDMA code to the controller 15.

The packet generator 19 generates a packet on the basis of the reception data (user data) from the MS 30. The generated packet can be transferred to the upper network via the NW interface 2.

The controller 15 generally controls the whole operation of the BS 1. FIG. 1 illustrates that the controller 15 can control each of the MAP information generator 17, the transmission processor 6 and the reception processor 11.

Figure 2:
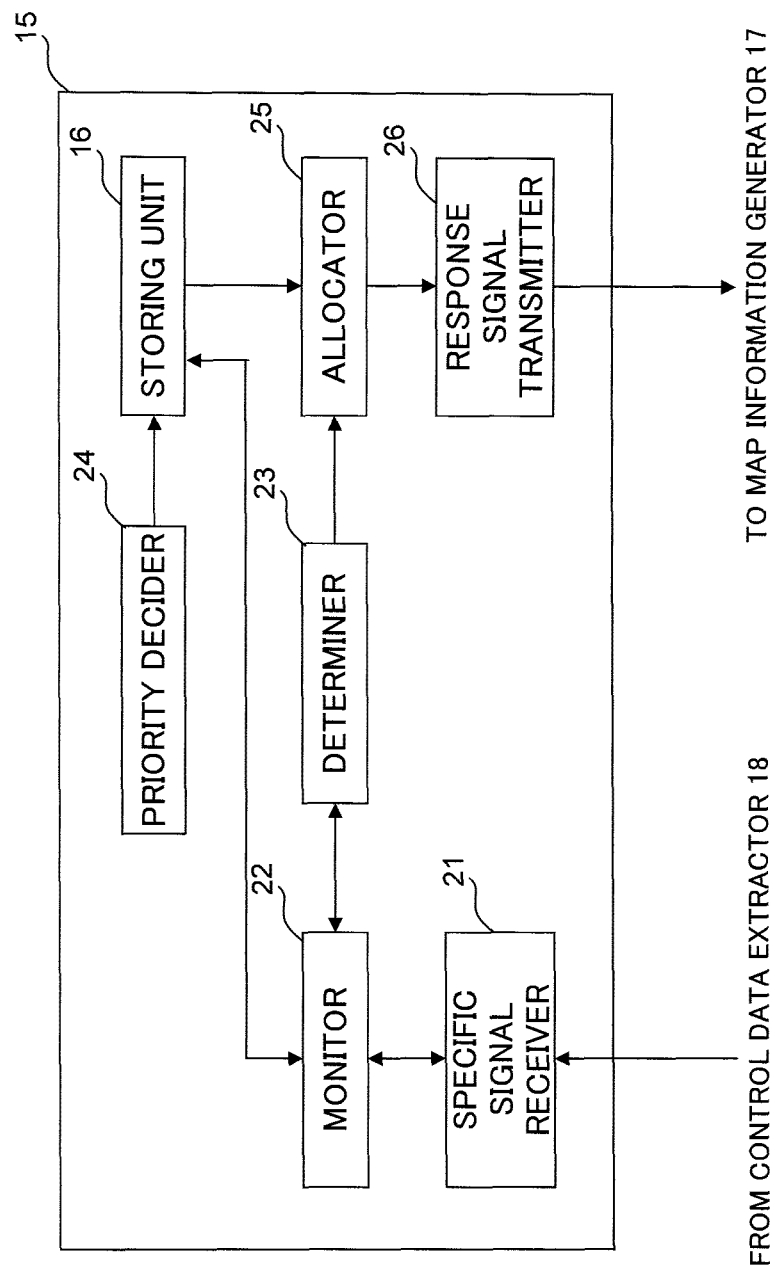
FIG. 2 is a block diagram illustrating configuration of essential parts of a controller of the BS depicted in FIG. 1.

The controller 15 has a function of controlling generation and transmission/reception processes of the control data so as to be able to control transmission of a response signal in response to the CDMA code from the MS 30 and the wireless resource (burst) allocation process based on a state of reception of the CDMA code. For this purpose, as illustrated in FIG. 2, the controller 15 has functions as at least a specific signal receiver 21, a monitor 22, a determiner 23, a priority decider 24, an allocator 25, a storing unit 16 and a response signal transmitter 26, when attention is given to functional feature of the controller 15.

The specific signal receiver (specific signal receiver) 21 receives a CDMA code from the MS 30, separated and extracted by the control data extractor 18. The monitor (monitor) 22 can monitor the state of reception of the CDMA codes received by the specific signal receiver 21, that is, the number of CDMA codes received at a specific frequency and for a specific period of time (in the CDMA bandwidth request zone) and the number of collisions of CDMA codes.

The determiner (determiner) 23 determines whether or not to perform the wireless resource (UL burst) allocation process on the basis of the priority beforehand set to the MS 30, that is, whether or not to perform the transmission process of a response signal (control data; CDMA Allocation IE message) in response to the CDMA code, according to a result of monitoring by the monitor 22. In this embodiment, the determiner 23 determines whether to perform the process on the basis of the priority decided (set) by the priority decider 24 according to a result of monitoring by the monitor 22 (that is, either the number of received CDMA codes or the number of collisions of CDMA codes). Incidentally, information on the CDMA code transmitted from the MS 30 is set in the above CDMA allocation IE message, whereby the object MS 30 can be specified by the CDMA code in the following sequence.

The priority decider (priority decider) 24 decides the priority on the basis of information about the MS 30. In this embodiment, the priority is based on a contract level of a user possessing the MS 30, or based on a wireless communication scheme between the BS 1 and the MS 30, as will be described later. The information about the decided priority (hereinafter, also referred to as priority information) is stored in the storing unit (priority information storing unit) 16. The wireless communication scheme is decided on the basis of one or more of modulation scheme, coding scheme and coding rate.

When the determiner 23 determines to perform the wireless resource (UL burst) allocation process based on the priority information, the allocator (allocator) 25 selects an MS 30 having priority to which the UL burst should be allocated on the basis of the priority information in the storing unit 16, and allocates a UL burst to the MS 30 having priority to make a bandwidth request. The allocation information is transferred to the MAP information generator 17 via the response signal transmitter 26, whereby a UL-MAP (the response signal that is control data) required at the MAP information generator 17 is generated.

The response signal transmitter 26 transfers the allocation information from the allocator 25 to the MAP information generator 17 so that MAP information required as the response signal is generated. When receiving the response signal (UL-MAP), the MS 30 detects that the MS 30 has acquired a right to transmit a bandwidth request to the BS 1, then gets into a state where the MS 30 can transmit a bandwidth request (Bandwidth Request message) to the BS 1 in a UL burst allocated by the UL-MAP.

The BS 1 according to the embodiment of this invention configured as above monitors the state of reception in the CDMA bandwidth request region in the UL subframe, that is, monitors the state of reception of the CDMA code (the number of received signals, the number of collisions) from the MS 30, controls the transmission (response) process of a response signal based on the predetermined priority according to a result of the monitoring, and controls the wireless resource allocation process irrespective of presence/absence of transmission of the CDMA code from the MS 30. Even when the BS 1 cannot discriminate the CDMA code because of collision of the CDMA code or cannot respond to all the CDMA codes, the BS 1 can preferentially allocate the wireless resource to an MS 30 having high priority.

(Explanation of Operation of BS 1)

In the BS 1 configured as above, when a signal transmitted from the MS 30 is received by the antenna 20, this reception signal is subjected to the wireless reception process, demodulation process and decoding process in the reception processor 11 (the receiver 12, the demodulator 13, the decoder 14) and inputted to the control data extractor 18, in which user data and control data in the reception signal are discriminated. The user data is assembled into packets by the packet generator 19, transferred from the NW interface 2 to the upper network, while the control data (CDMA code, bandwidth request, etc.) is transferred to the controller 15.

On the other hand, a packet destined for the MS 30 from the upper network is inputted to the packet identifier 3 via the NW interface 2. The packet is analyzed by the packet identifier 3 to identify a destination MS 30, a QoS class, etc. The identification information of the packet is transferred to the MAP information generator 17, while the payload of the packet is transferred to the packet buffer 4.

The MAP information generator 17 generates MAP information in the DL (DL-MAP) for each CID corresponding to the destination MS 30 or the QoS class on the basis of the identification information given from the packet identifier 3 under control of the controller 15, and generates MAP information in the UL (UL-MAP). The MAP information generator 17 also generates a GMH to be added to a packet held in the packet buffer 4.

The packet held in the packet buffer 4 is transferred to the PDU generator 5 at desired transmission timing, is added thereto header information (GMH) by the PDU generator 5, is inputted to the transmission processor 6, is subjected to the coding process, modulation process, wireless transmission process in the encoder 7, the modulator 8 and the transmitter 9, and is transmitted toward the MS 30 via the antenna 20.

(Explanation of Operation of Controller 15)

Figure 3:
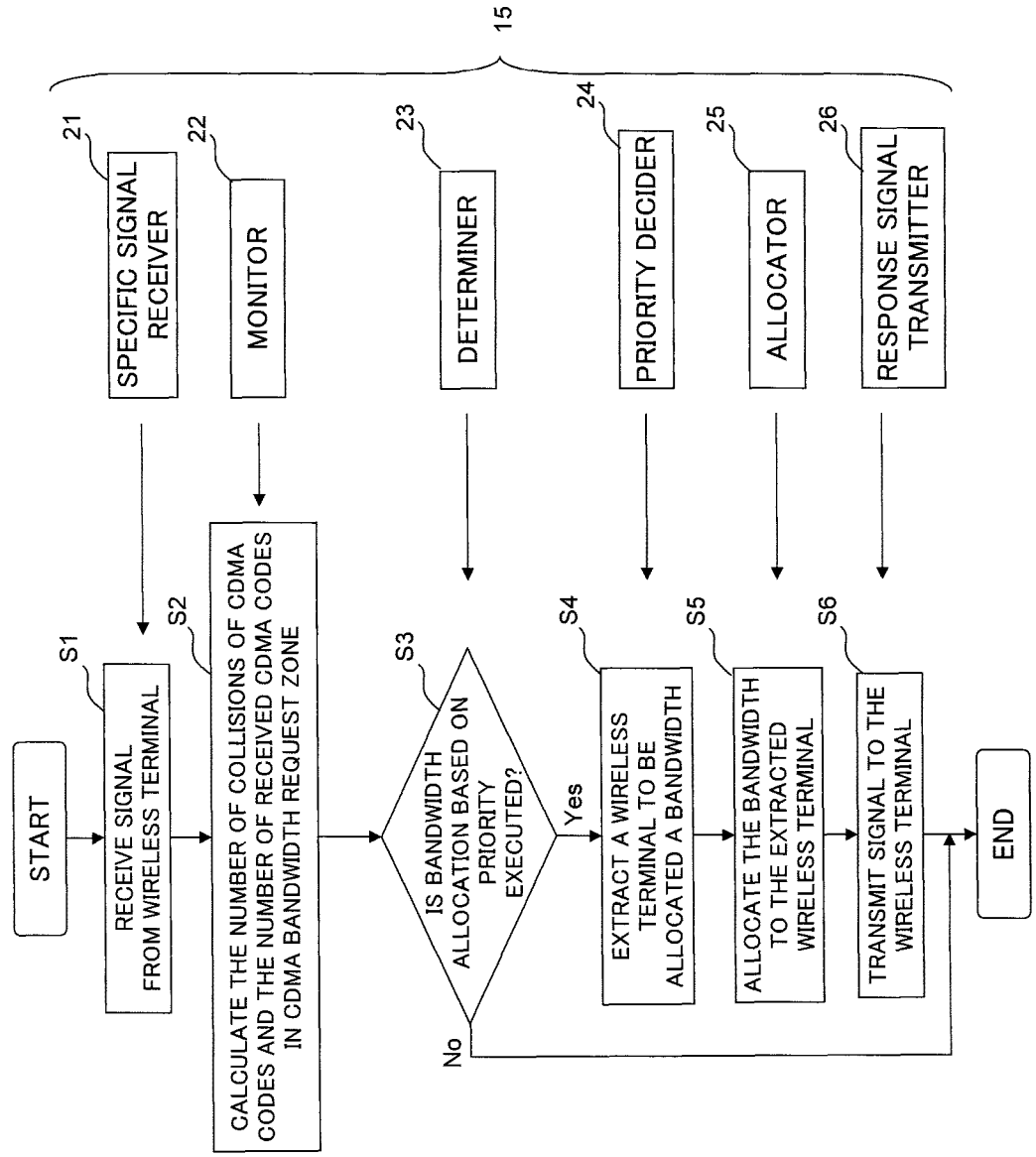
FIG. 3 is a flowchart illustrating an example of operation of the BS (controller) depicted in FIGS. 1 and 2.

Next, an example of the operation (wireless resource allocation process) of the controller 15 of the BS 1 configured as above will be described with reference to a flowchart illustrated in FIG. 3.

First, in the BS 1, the control data extractor 18 extracts a CDMA code, which is a specific signal in the CDMA band width request region in the UL subframe, from reception data from the MS 30 having undergone the reception process in the reception processor 11, and the specific signal receiver 21 receives the CDMA code (step S1).

In the BS 1, the monitor 22 monitors (calculates) the state of reception of CDMA codes by the specific signal receiver 21 (the number of received CDMA codes and the number of collisions of CDMA codes in the CDMA bandwidth request region) (step S2).

The determiner 23 determines whether to perform wireless resource (UL burst) allocation (transmission process of a response signal in response to the CDMA code) on the basis of priority information about the MS 30 beforehand set (registered) by the priority determiner 24 and stored information in the storing unit 16 according to a result of the monitoring (the number of received CDMA codes and the number of collisions of CDMA codes in the CDMA bandwidth request region) by the monitor 22 (step S3).

When the determiner 23 determines not to perform the wireless resource (UL burst) allocation on the basis of the priority (see No route at step S3), the allocator 25 allocates the wireless resource (UL burst) only to an MS 30 whose CDMA code has been able to be normally received, irrespective of the priority thereof. Namely, the controller 15 generates a response signal (CDMA Allocation IE message) including information about the CDMA code and broadcasts the response signal by a UL-MAP, taking normal reception of the CDMA code as an opportunity, thereby giving permission to the source MS 30 having transmitted the CDMA code to transmit a bandwidth request, and notifying (designating) an UL burst to be used for the bandwidth request.

On the other hand, when the determiner 23 determines to perform the wireless resource (UL burst) allocation on the basis of the priority (see Yes route at step S3), the controller 15 selects and extracts one or more object MSs 30 having priority to be allocated the UL burst for a bandwidth request from the priority information (a priority table in this embodiment) about MSs 30 beforehand set (registered) in the storing unit 16 by the priority decider 24, irrespective of presence/absence of reception of the CDMA code at this point of time (step S4). The allocator 25 allocates a UL burst used to transmit a bandwidth request to the preference MS 30 (step S5), and generates a UL-MAP according to the allocation information. The response signal transmitter 26 broadcasts the UL-MAP (step S6).

As above, the BS 1 according to this embodiment determines whether to perform the wireless resource (UL burst) allocation based on priority information beforehand set to the MS 30 according to a result of monitoring of a state of reception of the CDMA code in the CDMA bandwidth request region (the number of received CDMA codes and the number of collisions of CDMA codes in the CDMA bandwidth request region) from the MS 30. When determining to perform the wireless resource allocation based on the priority information, the BS 1 allocates the wireless resource (UL burst for a bandwidth request) based on the priority information. Therefore, the BS 1 can preferentially allocate the wireless resource to an MS 30 having high priority irrespective of presence/absence of transmission of the CDMA code from the MS 30 even when the BS 1 cannot discriminate the CDMA due to collision of the CDMA code or even when the BS 1 cannot respond to all the received CDMA codes.

Hereinafter, detailed description will be made of essential parts (the monitor 22, the determiner 23, the priority decider 24 and the allocator 25) in the controller 15 of the BS 1.

(Explanation of Monitor 22)

Figure 4:
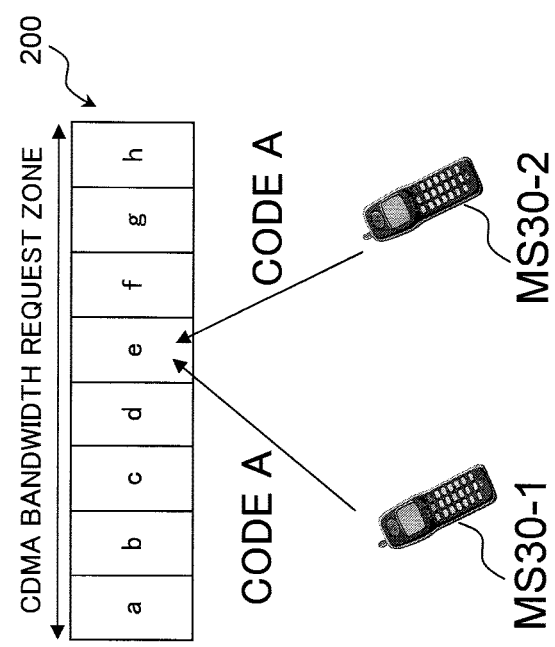
FIG. 4 is a schematic diagram illustrating an example of collision of CDMA codes in a CDMA bandwidth request region.

An example of operation of the monitor 22 of this embodiment will be described with reference to FIG. 4. FIG. 4 is a schematic diagram illustrating an example of collision of CDMA codes in the CDMA bandwidth request region.

As illustrated in FIG. 4, the CDMA bandwidth request region 200 in the UL subframe is divided into a plurality of sections (into different times or into different frequencies) as designated by reference characters a to "h" in the drawing, for example. Accordingly, even if the CDMA codes of a plurality of MSs 30 are identical, that is, even if the CDMA code of an MS 30-1 and the CDMA code of an MS 30-2 are identical (for example, the both are code A), the BS 1 can identify (discriminate) the CDMA codes of the both MSs and can normally receive the CDMA codes when receiving the CDMA codes in separate sections (for example, in a section denoted by a reference character "a" and a section denoted by a reference character "b").

Even if the CDMA code from the MS 30-1 and the CDMA code from the MS 30-2 are stored and received in the same section (for example, a section denoted by a reference character "c"), for example, the BS 1 can normally receive both the CDMA codes because the BS 1 can identify (discriminate) the CDMA codes as long as the CDMA code (code A) from the MS 30-1 differs from the CDMA code (code B differing from code A) from the MS 30-2.

However, the above CDMA bandwidth request region 200 is shared by a plurality of MSs 30 (that is, MSs 30 connected to BS) having been subjected to the negotiation process (user authentication process, etc.) required to receive data from the BS 1, and each of these plural MSs 30 selects one of plural CDMA codes at random and transmits the CDMA code at a random frequency and at a random timing (symbol time) with the use of the CDMA bandwidth request region 200. For this reason, when plural MSs 30-1 and 30-2 transmit the identical CDMA codes (for example, code A) at the same frequency and at the same timing (for example, a section denoted by reference character e) in the CDMA bandwidth request region 200 to the BS 1, as illustrated in FIG. 4, collision of the CDMA codes occurs, hence the BS 1 cannot normally receive the identical CDMA codes (code A) from the both MSs.

But, the receive level of the CDMA code from the MS 30 is large enough to be detected by the BS 1, hence the BS 1 can detect that the BS 1 has received some signal even when collision of CDMA codes transmitted from plural MSs 30 occurs.

In other words, the BS 1 can detect (calculate) the number of collisions of CDMA codes "y" ("y" is an integer not less than zero) by detecting occurrence of collision of CDMA codes.

The monitor 22 can detect a frame number "N" (N is an integer) of a frame including the CDMA code, the number of times "x" (x is an integer not less than zero) the CDMA code has been normally received, the number of response signals (the allocable number) "w" ("w" is an integer not less than zero) that the BS 1 can respond to the CDMA codes, and the magnitude (CDMA bandwidth request region size) "z" (z is an integer not less than zero) of the CDMA bandwidth request region 200, on the basis of the wireless frame received from the MS 30, various setting information beforehand set in the BS 1, and a state of communication between the BS 1 and the MS 30. The CDMA bandwidth request region size can be calculated on the basis of a frequency and a symbol time defining the CDMA bandwidth request region, for example.

Figure 9:
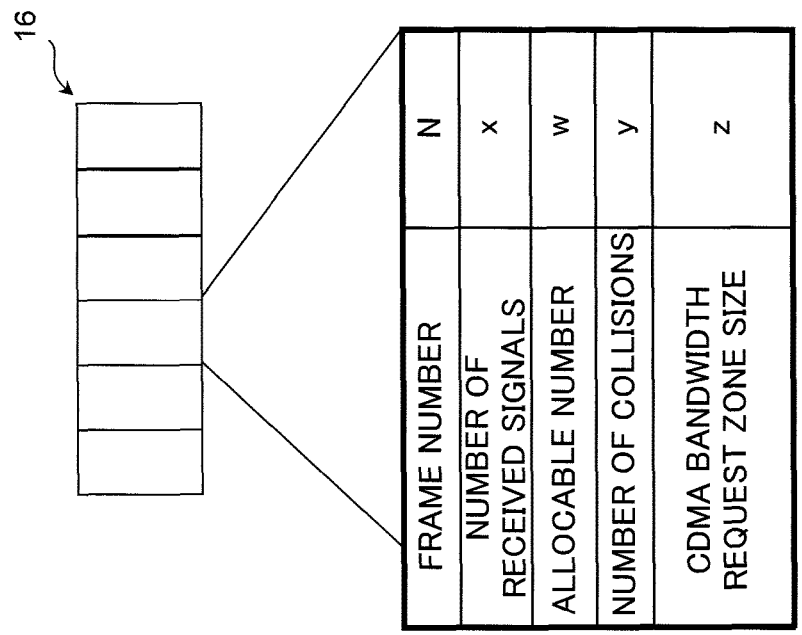
FIG. 9 is a schematic diagram illustrating an example of information stored in a storing unit.

The monitor 22 stores a frame number "N", the number of received CDMA codes "x", the allocable number "w", the number of collisions of CDMA codes "y", and the CDMA bandwidth request region size "z" in the storing unit 16. FIG. 9 is a schematic diagram illustrating an example of information stored in the storing unit 16.

As illustrated in FIG. 9, the number of received CDMA codes "x", the allocable number "w", the number of collisions of CDMA codes "y" and the CDMA bandwidth request region size "z" are stored in the storing unit 16, in association with a frame number "N". Accordingly, the BS 1 can accumulate various kinds of information (a frame number "N", the number of received CDMA codes "x", the allocable number "w", the number of collisions of CDMA codes "y", the CDMA bandwidth request region size "z", etc.) for each frame number received in the past by the BS 1.

With the above configuration, the monitor 22 according to this embodiment can calculate the number of collisions of CDMA codes and the number of received CDMA codes from the MS 30, and can notify the determiner 23 of the above various kinds of information.

Further, by accumulating the various kinds of information in the storing unit 16, it becomes possible to notify the determiner 23 of the various kinds of information about the CDMA code that the BS 1 received from the MS 30 in the past.

Alternatively, the monitor 22 may detect (calculate) only information required for the determination process in the determiner 23 (for example, the number of received CDMA codes "x", the number of collisions of CDMA codes "y"). In such case, the BS 1 monitors the number of received CDMA codes "x" and the number of collisions of CDMA codes "y", thereby to perform the wireless resource allocation process on the basis of information about the priority according to a state of congestion of communication between the BS 1 and the MS 30, which enables more efficient wireless resource allocation process.

Still alternatively, the monitor 22 may monitor (calculate) the number of received CDMA codes "x" and the allocable number "w" as information required for the determination process in the determiner 23. In such case, the determiner 23 can determine whether to perform the wireless resource allocation process based on information about the priority, in conformity with more detailed determination reference according to the state of communication between the BS 1 and the MS 30, which enables the BS 1 to perform the wireless resource allocation process more efficiently.

Still alternatively, the determiner 22 may perform the above determination operation on the basis of a history of reception of various kinds of information that the BS 1 received in the past because the BS 1 stores various kinds of past information. For example, when an average value of the number of collisions of CDMA codes "y" for a predetermined period of time calculated by the monitor 22 is larger than a predetermined threshold value, the determiner 22 determines to perform the wireless resource allocation process based on information about the priority. On the other hand, when an average value of the number of collisions of CDMA codes "y" for a predetermined period of time is equal to or less than the predetermined threshold value, the determiner 22 determines not to perform the wireless resource allocation process based on information about the priority.

(Explanation of Priority Decider 24)

Figure 6:
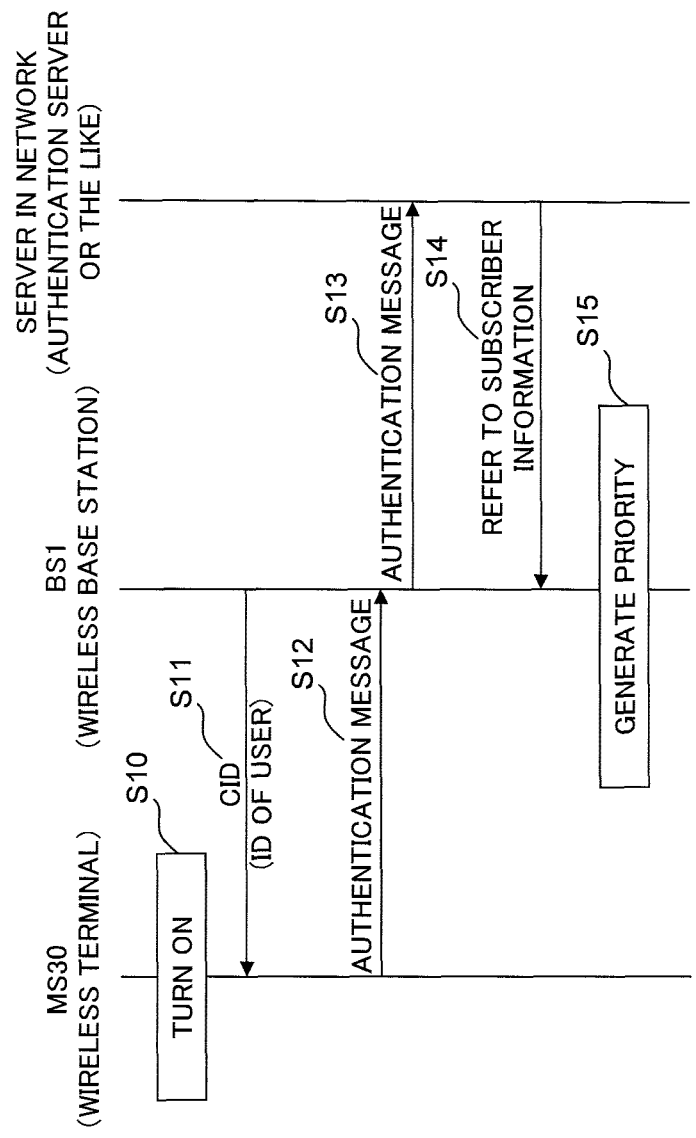
FIG. 6 is a sequence diagram illustrating an example of operation for priority table generation by the controller depicted in FIG. 2.
Figure 8:
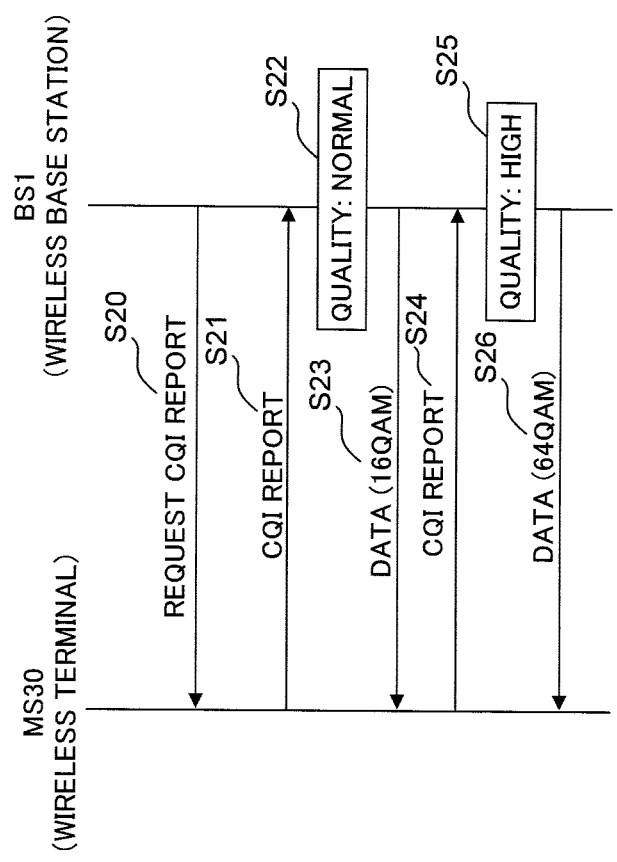
FIG. 8 is a sequence diagram illustrating an example of operation for the priority table generation by the controller depicted in FIG. 2.

Next, an example of operation of the priority decider 24 will be described with reference to FIGS. 5 to 8. FIG. 5 is a diagram illustrating a priority table generated by the controller 15. FIG. 6 is a sequence diagram illustrating an example of the priority table generation operation by the controller 15. FIG. 7 is a diagram illustrating a table in which wireless communication schemes between the BS 1 and a plurality of MSs are set. FIG. 8 is a sequence diagram illustrating a method of setting a wireless communication scheme on the basis of a CQI report from the MS.

In this embodiment, the priority decider 24 generates the priority table on the basis of information (subscriber information, wireless communication scheme, etc.) about the MS 30, and stores the priority table in the storing unit 16. In the priority table, a plurality of MSs 30-1 to 30-5 connected to the BS 1 are associated with information about the priority (high, normal, etc.), as illustrated in FIG. 5. In this embodiment, the allocator 25 can select preferential MSs (MS 30-2 and MS 30-3) having "high" priority, for example, by referring to the priority table, and can generate allocation information required to generate a UL-MAP therefor in preference to MSs (MS 30-1, MS 30-4 and MS 30-5) having "normal" priority.

Next, an example of the priority table generation method will be described with reference to FIG. 6. In the example illustrated in FIG. 6, the priority table is generated on the basis of subscriber (user) information (for example, contract level of the user).

First, the user sets the power source of the MS 30 to ON (step S10) to connect the MS 30 to the wireless communication system (wireless network) via the BS 1. The BS 1 Allocates a User ID (CID) to the MS 30 (Step S11).

Next, the MS 30 sends back an authentication message to the BS 1 (step S12). The BS 1 performs connection authentication of the MS 30 with the use of the authentication message from the MS 30. Namely, only when the MS 30 is an authentic user (MS) permitted to connect to the wireless network, the BS 1 permits the MS 30 to connect to the wireless network.

The BS 1 then transmits the above CID and an authentication message to a server (authentication server or the like) in the network connected to the wireless network (step S13), thereby to refer to subscriber (user) information through the authentication server (step S14).

The priority determiner 24 in the BS 1 generates the priority table on the basis of the subscriber information (step S15). As the subscriber information, there are used a contract level of the user, service information on the subscriber, etc.

In practice, when the contract level of the user is higher than contract levels of the other users, the priority of an MS 30 possessed by this user is set "high". When the contract level of the user is lower than contract levels of the other users, the priority of the MS 30 possessed by this user is set "low". Incidentally, the priority can be set as required ("normal" or the like) other than "high" and "low". If doing so, it becomes possible to set the priority of the MS 30 in more detail, and to perform the wireless resource allocation process more efficiently.

Alternatively, the priority decider 24 may decide the priority according to information (hereinafter, referred to as wireless communication scheme information, occasionally) about the wireless communication scheme (MCS: Modulation and Coding Scheme) between the BS 1 and the MS 30 other than the priority based on the above subscriber information.

As illustrated in FIG. 7, the priority table may be made by associating wireless communication schemes between the BS 1 and a plurality of MSs (MS 30-1 to MS 30-5) connected to the BS 1 with priorities ("high", "normal", "low" and the like) according to the wireless communication schemes, for example. When using such priority table, the allocator 25 can select MSs (MS 30-3 and MS 30-4) whose wireless communication schemes are 64 QAM (Quadrature Amplitude Modulation) and whose priorities are "high" as the preferential MSs, and can generate allocation information for the MSs (MS 30-3 and MS 304) required for UL-MAP generation in preference to other MSs (MS 30-1, MS 30-2 and MS 30-5).

The allocator 25 then can select an MS (MS 30-1) whose wireless communication scheme is 16 QAM and whose priority is "normal" as the preferential MS 30, and can generate allocation information for the MS (MS 30-1) required for UL-MAP generation in preference to other MSs (MS 30-2 and MS 30-5 having "low" priority).

Whereby, the BS 1 can preferentially allocate the wireless resource to the MS 30 using a wireless communication scheme having higher communication efficiency so as to allocate the wireless resource to more MSs 30.

Next, an example of the priority table generation method illustrated in FIG. 7 will be described with reference to FIG. 8. In the example illustrated in FIG. 8, the priority table is generated on the basis of information (CQI: Channel Quality Indicator) about communication quality from an MS 30 connected to the BS 1.

The BS 1 demands a report of CQI (CQI report) from the MS 30 having been connected to the BS 1 (step S20). The MS 30 having received the demand for the CQI report sends back a CQI value according to communication environments between the BS 1 and the MS 30 to the BS 1 (step S21).

The BS 1 having received the CQI report from the MS 30 determines the communication quality between the MS 30 and the BS 1 (to be "normal" in this case) according to the CQI value (step S22), sets the wireless communication scheme between the MS 30 and the BS 1 to 16 QAM, and sends downlink data to the MS 30 (step S23). On this occasion, the priority decider 24 sets "16 QAM" to the wireless communication scheme and "normal" to the priority with respect to the MS 30 in the priority table illustrated in FIG. 7.

The MS 30, regularly or irregularly, reports the BS 1 of a new CQI value according to the communication environments between the BS 1 and the MS 30 (step S24).

The BS 1 having received the new CQI report from the MS 30, the BS 1 again determines the communication quality between the MS 30 and the BS 1 (to be "high" in this case) according to the CQI value (step S25), changes the setting of the wireless communication scheme between the MS 30 and the BS 1 to 64 QAM, and transmits downlink data to the MS 30 (step S26). On this occasion, the priority decider 24 sets "64 QAM" to the wireless communication scheme and "high" to the priority with respect to the MS 30 in the priority table illustrated in FIG. 7.

Among the above wireless communication schemes, a wireless communication scheme having higher efficiency (for example, 64 QAM or the like) requires less wireless resource in amount to be used in communication. Accordingly, the BS 1 can allocate the wireless resource to more MSs.

The priority decider 24 operating as above in this embodiment can generate the priority table on the basis of at least either subscriber information or wireless communication schemes between MSs 30 and the BS 1. Whereby, the BS 1 can preferentially allocate the wireless resource to a user under contract in higher level or an MS 30 using a wireless communication scheme of higher efficiency, and can set the priority more finely, which enables the BS 1 to perform the wireless resource allocation process (response signal transmission process) according to various circumstances.

Alternatively, the priority decider 24 may generate the priority on the basis of both subscriber information and wireless communication schemes. If doing so, more detailed priority can be set. For example, when the priority based on the subscriber information (contract level) is "high" and the priority based on the wireless communication scheme is "high", the priority is set to "high". When the priority based on the subscriber information is "normal" and the priority based on the wireless communication scheme is "normal", the priority is set to "normal". Such priority generation method can generate (set) nine (3×3=9) kinds of the priority. Further, if information about the priority and information about the wireless communication scheme are set more finely, the priority of the MS 30 can be set more finely.

(Explanation of Determiner 23)

Next, an example of operation of the determiner 23 will be described with reference to FIG. 9.

In this embodiment, the determiner 23 determines whether to perform the wireless resource allocation process (transmission of a response signal to a CDMA code) based on priority generated by the priority decider 24 according to a result of monitoring (a frame number "N", the number of received CDMA codes "x", the allocable number "w", the number of collisions of CDMA codes "y", the CDMA bandwidth request region size "z", etc.) by the monitor 22 and set in the priority table.

For example, the determiner 23 can determine whether to perform the wireless resource allocation process (response signal transmission process) based on the priority according to the number of received CDMA codes "x" and the allocable number "w" stored in the storing unit 16. In practice, when the number of received CDMA codes "x" is larger than the allocable number "w", that is, when x/w>1 is satisfied, the determiner 23 determines to perform the wireless resource allocation process (response signal transmission process) based on the priority, irrespective of the number of collisions of CDMA codes "y" and the CDMA bandwidth request region size "z".

Accordingly, when the number of received CDMA codes from a plurality of MSs 30 exceeds the number of response signals that the BS 1 can transmit, the BS 1 can preferentially transmit (respond) response signals to MSs 30 having higher priority than the other MSs 30.

Alternatively, the determiner 23 may determine whether to perform the wireless resource allocation process (response signal transmission process) based on the priority, according to the number of collisions of CDMA codes "y" and the CDMA bandwidth region request size "z" stored in the storing unit 16, for example. In practice, when a rate of the number of collisions of CDMA codes "y" to the CDMA bandwidth request region size "z" is larger than a threshold value "T" beforehand set by the user, that is, when y/z>T, the determiner 23 determines to perform the wireless resource allocation process (response signal transmission process) based on the priority.

Accordingly, when a rate of the number of collisions of CDMA codes "y" from a plurality of MSs 30 to the CDMA bandwidth request region 200 "z" exceeds a predetermined rate, the determiner 23 can preferentially transmit (respond) response signals to MSs 30 having higher priority.

Still alternatively, the determiner 23 may determine whether to perform the wireless resource allocation process (response signal transmission process) based on the priority, according to the number of CDMA codes "x" received by the BS 1 in the past and the number of collisions of CDMA codes "x" in the past.

For example, when an average value of the number of collisions of CDMA codes for a predetermined period of time is larger than a predetermined threshold value, the determiner 23 determines to perform the wireless resource allocation process based on information about the priority. On the other hand, when an average value of the number of collisions of CDMA codes for the predetermined period of time is equal to or less than the predetermined threshold value, the determiner 23 determines not to perform the wireless resource allocation process based on the information about the priority.

Note that the determiner 23 may employ various determination methods based on the various kinds of information, other than the above examples.

(Explanation of Allocator 25)

Figure 10:
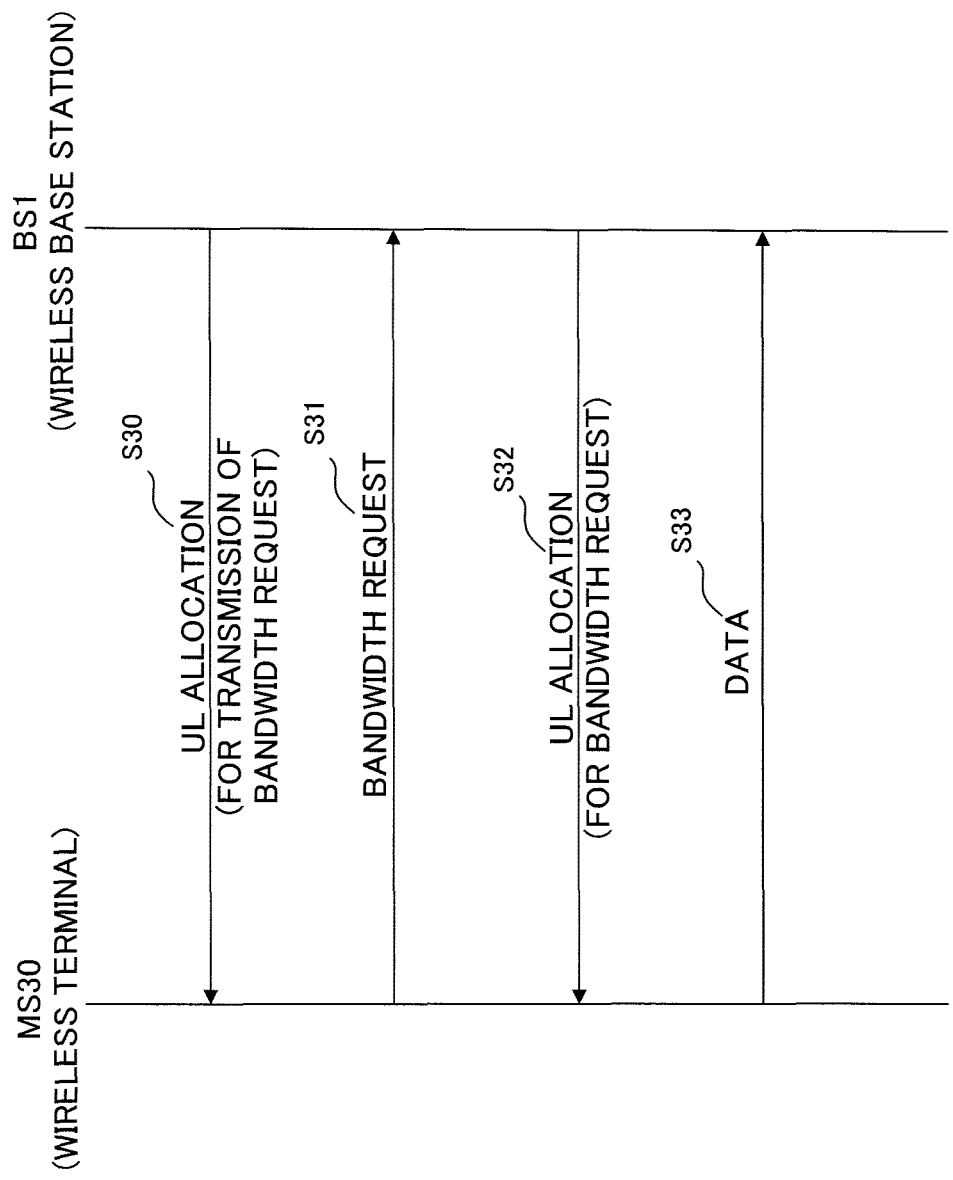
FIG. 10 is a sequence diagram illustrating a wireless resource allocation process by the BS depicted in FIG. 1.
Figure 11:
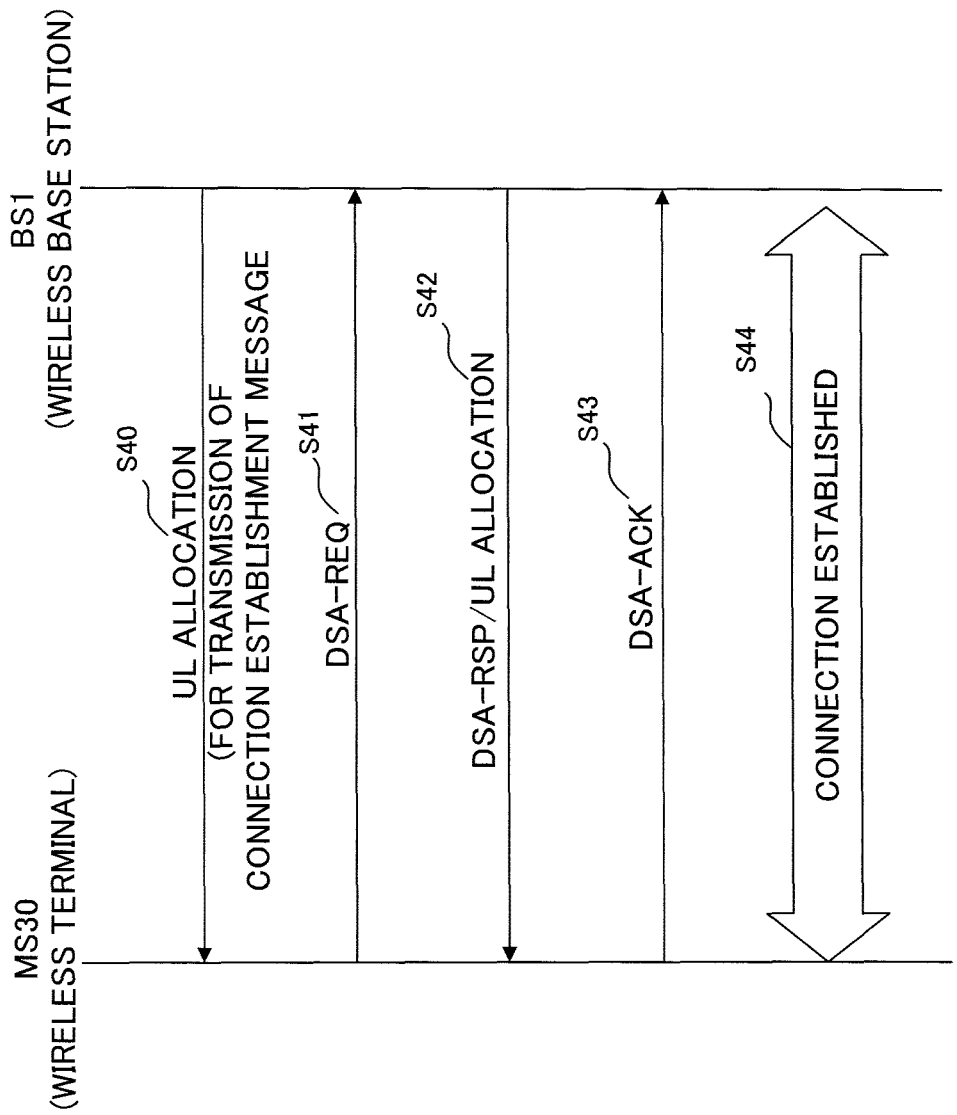
FIG. 11 is a sequence diagram illustrating the wireless resource allocation process by the BS depicted in FIG. 1.
Figure 12:
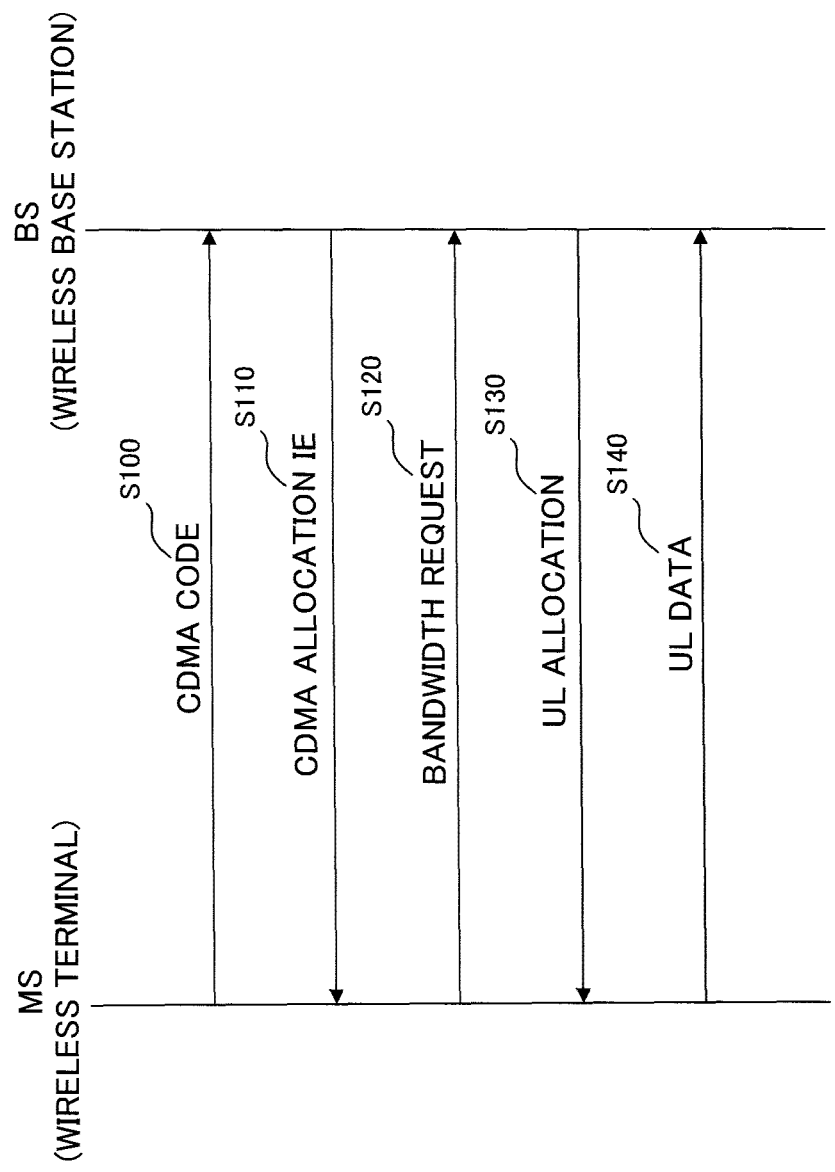
FIG. 12 is a sequence diagram illustrating an operation at the time of a start of communication in a wireless communication system.

Next, an example of operation of the allocator 25 will be described with reference to FIGS. 10 and 11. FIGS. 10 and 11 are sequence diagrams illustrating the wireless resource allocation process by the BS 1.

In this embodiment, when the determiner 23 determines to perform the wireless resource allocation process (response signal transmission process) based on the priority, the allocator 25 extracts MSs 30 having higher priority from the priority table (see FIGS. 5 and 7) generated by the priority decider 24. For example, the allocator 25 extracts MSs 30 having higher priority from the priority table in order, starting from the top line of the priority table, whereby the BS 1 can preferentially allocate the wireless resource to these MSs 30, that is, can transmit (respond) response signals to these MSs 30. Note that the order of the priority in this embodiment is (1) "high", (2) "normal" and (3) "low".

Namely, the allocator 25 selects a preferential MS 30 extracted from the priority table. This preferential MS 30 transmits a wireless resource request to the BS 1. In the BS 1 having received this wireless resource request, the allocator 25 performs the following wireless resource allocation process.

The allocator 25 performs the wireless resource allocation in response to a wireless resource (bandwidth) allocation request from the MS 30. As illustrated in FIG. 10, for example, the allocator 25 first allocates the wireless resource (bandwidth or the like) of an amount for transmitting a wireless resource request to be transmitted from the MS 30.

In other words, the BS 1 first allocates the wireless resource (UL Allocation (for transmitting a Bandwidth Request) of an amount for transmitting a wireless resource request to be transmitted from the MS 30 as a response signal to the MS 30 (step S30). The MS 30 having been allocated the wireless resource of an amount for transmitting a wireless resource request transmits a wireless resource request signal (Bandwidth Request) to the BS 1 (step S31).

The BS 1 having received the wireless resource request signal from the MS 30 transmits a signal (UL Allocation) for allocating the wireless resource requested by the wireless resource request signal to the MS 30 (step S32). The MS 30 transmits UL data (Data) to the BS 1 with the use of the wireless resource allocated by the BS 1 (step S33). When the state of communication between the BS 1 and the MS 30 is congested, that is, when the number of received CDMA codes "x" exceeds the allocable number "w", for example, the allocator 25 can allocate the wireless resource (bandwidth) of just an amount for a message to be transmitted from the MS 30 for the purpose of establishment of a connection with the BS 1, irrespective of the wireless resource request from the MS 30.

For example, as illustrated in FIG. 11, the BS 1 allocates, to the MS 30, the wireless resource (UL Allocation (for transmitting a connection establishment message) of an amount for transmitting a control signal (connection establishment message) for establishing a communication between the MS 30 and the BS 1 (step S40). The MS 30 having been allocated the wireless resource transmits a signal (DSA-REQ: Dynamic Service Addition-REQuest) for requesting for establishment of a connection to the BS 1 (step S41).

The BS 1 permits connection establishment in response to the DSA-REQ from the MS 30, and sends back a signal (DSA-RSP/UL Allocation: Dynamic Service Addition-ReSPonse/UL Allocation) for allocating the wireless resource to the MS 30 (step S42). The MS 30 sends back a signal (DSA-ACK: Dynamic Service Addition-ACKnowledge) for reporting (confirming) that the MS 30 has received the DSA-RSP/UL Allocation from the BS 1 (step S43), whereby a connection between the MS 30 and the BS 1 is established (step S44).

In the above operation, the BS 1 allocates, to the MS 30, the wireless resource of an amount for only a message to be transmitted to establish a connection between the BS 1 and the MS 30 so as to perform efficient wireless resource allocation even when the state of communication between the BS 1 and the MS 30 is congested. Further, it is possible to more shorten the time required to establish the connection than before.

Since the allocator 25 does not perform the wireless resource allocation process based on the priority with respect to the MS 30 currently communicating with the BS 1, thereby to allocate the wireless resource (transmit response signals) to more MSs 30.

The allocator 25 according to this embodiment operates as above to allocate the wireless resource in response to a wireless resource allocation request from the MS 30, thereby to satisfy the wireless resource allocation request from the wireless terminal.

The BS 1 can efficiently allocate the wireless resource even when the state of communication between the BS 1 and the MS 30 is congested, by allocating the wireless resource of an amount to be used for only a message that the MS 30 is to transmit in order to establish a connection.

The BS 1 does not perform wireless resource allocation based on the priority with respect to an MS 30 currently communicating with the BS 1, thereby to efficiently allocate the wireless resource to more MSs 30.

[B] Others

As having been described in detail by way of examples, the present invention is not limited to the above examples, but may be modified in various ways without departing from the scope of the invention.

For example, only necessary operations may be selected from among operations of the monitor 22, the determiner 23, the priority decider 24 and the allocator 25, and combined to operate the BS 1.

Industrial Applicability

As having been described in detail, according to the present invention, the BS monitors the state of reception of CDMA codes (CDMA bandwidth request region that is a common region in the wireless frame) from a plurality of MSs, and performs wireless resource (UL burst for bandwidth request) allocation process based on priority beforehand set to each of the plural MSs according to a result of the monitoring. Even when the CDMA codes are simultaneously transmitted from the MSs to the BS, the BS can allocate the wireless resource preferentially to a user having higher priority, irrespective of presence/absence of transmission of the CDMA code from the MS. Therefore, the present invention is considered to be very useful in the wireless communication technique, particularly, in the mobile wireless communication technique where a region (channel) used to obtain permission to send a bandwidth request is a common region (common channel).

The invention claimed is:

1. A wireless resource allocation method in a wireless communication system having a plurality of wireless terminals and at least one wireless base station communicating with the plural wireless terminals, the wireless resource allocation method comprising:

at the wireless base station,
monitoring a state of reception of specific signals, each of the specific signals being transmitted from one of the plural wireless terminals for obtaining transmission permission to transmit a request for wireless resource allocation before the transmission of the request to the wireless base station;
determining whether to execute the wireless resource allocation based on priority beforehand set to each of the plural wireless terminals according to a result of the monitoring; and
executing the wireless resource allocation based on the priority when the wireless resource allocation based on the priority is determined to be executed,
wherein the wireless base station monitors the number of collisions of the specific signals received at a specific frequency band and for a specific period of time, and determines whether to execute the wireless resource allocation based on the priority according to the number of collisions of the specific signals; and
wherein the priority is based on a contract level of a user possessing each of the wireless terminals.

2. The wireless resource allocation method in a wireless communication system according to claim 1, wherein the wireless base station monitors the number of the specific signals received at the specific frequency band and for the specific period of time, and determines whether to execute the wireless resource allocation based on the priority according to the number of the received specific signals.

3. The wireless resource allocation method in a wireless communication system according to claim 2, wherein the wireless base station determines whether to execute the wireless resource allocation based on the priority according to the number of the received specific signals and the number of response signals to the specific signals that the wireless base station can transmit.

4. The wireless resource allocation method in a wireless communication system according to claim 1, wherein the wireless base station determines whether to execute the wireless resource allocation based on the priority according to the number of the specific signals received in the past, the number of response signals to the specific signals that the wireless base station was able to transmit in the past and the number of collisions of the specific signals in the past.

5. The wireless resource allocation method in a wireless communication system according to claim 1, wherein the priority is based on a wireless communication scheme between the wireless base station and each of the wireless terminals.

6. The wireless resource allocation method in a wireless communication system according to claim 5, wherein the wireless communication scheme is based on one or more of modulation scheme, coding scheme and coding rate.

7. The wireless resource allocation method in a wireless communication system according to claim 1, wherein the wireless base station allocates the wireless resource of an amount to be used by a wireless terminal to transmit a wireless resource allocation request to the wireless base station.

8. The wireless resource allocation method in a wireless communication system according to claim 1, wherein the wireless base station allocates the wireless resource of an amount to be used by a wireless terminal to transmit a message for establishing a connection to the wireless base station.

9. The wireless resource allocation method in a wireless communication system according to claim 1, wherein the wireless base station does not allocate the wireless resource based on the priority to a wireless terminal currently communicating with the wireless base station.

10. A wireless base station in a wireless communication system having a plurality of wireless terminals and at least one wireless base station, the wireless base station comprising:
   a specific signal receiver that receives specific signals, each of the specific signals being transmitted from one of the plural wireless terminals for obtaining transmission permission to transmit a request for wireless resource allocation before the transmission of the request to the wireless base station;
   a monitor that monitors a state of reception of the specific signals received by the specific signal receiver;
   a determiner that determines according to a result of monitoring by the monitor whether to execute the wireless resource allocation based on priority beforehand set to each of the plural wireless terminals; and
   an allocator that allocates the wireless resource based on the priority when the determiner determines to execute the wireless resource allocation based on the priority,
   wherein the monitor monitors the number of collisions of the specific signals received at a specific frequency band and for a specific period of time, and
   the determiner determines whether to execute the wireless resource allocation based on the priority according to the number of collisions of the received specific signals; and
   wherein the priority is based on a contract level of a user possessing each of the wireless terminals.

11. The wireless base station in a wireless communication system according to claim 10, wherein the monitor monitors the number of the specific signals received at the specific frequency band and for the specific period of time; and
   the determiner determines whether to execute the wireless resource allocation based on the priority according to the number of the received specific signals.

12. The wireless base station in a wireless communication system according to claim 11, wherein the determiner determines whether to execute the wireless resource allocation based on the priority according to the number of the received specific signals and the number of response signals to the specific signals that the wireless base station can transmit.

13. The wireless base station in a wireless communication system according to claim 10, wherein the determiner determines whether to execute the wireless resource allocation based on the priority according to the number of the specific signals received in the past, the number of response signals to the specific signals that the wireless base station was able to transmit in the past and the number of collisions of the specific signals in the past.

14. The wireless base station in a wireless communication system according to claim 10, further comprising:
   a priority decider that decides the priority based on information about each of the wireless terminals.

15. The wireless base station in a wireless communication system according to claim 14, wherein the priority decider decides the priority based on a wireless communication scheme between the wireless base station and each of the wireless terminals.

16. The wireless base station in a wireless communication system according to claim 15, wherein the wireless communication scheme is based on one or more of modulation scheme, coding scheme and coding rate.

17. The wireless base station in a wireless communication system according to claim 10, wherein the allocator allocates to a wireless terminal the wireless resource of an amount to be used to transmit a wireless resource allocation request from the wireless terminal to the wireless base station.

18. The wireless base station in a wireless communication system according to claim 10, wherein the allocator allocates to a wireless terminal the wireless resource of an amount to be used to transmit a message for establishing a connection between the wireless base station and the wireless terminal.

19. The wireless base station in a wireless communication system according to claim 10, wherein the allocator does not allocate the wireless resource based on the priority to a wireless terminal currently communicating with the wireless base station.

20. A wireless resource allocation method in a wireless communication system having a plurality of wireless terminals and at least one wireless base station communicating with the plural wireless terminals by using a wireless frame, the wireless resource allocation method comprising:
   at the wireless base station,
      monitoring a state of reception in a common transmission region in the wireless frame to be shared by the plural wireless terminals, the common transmission region being used for transmitting each of specific signals from one of the plural wireless terminals for obtaining transmission permission to transmit a request for wireless resource allocation before the transmission of the request to the wireless base station; and controlling allocation of a transmission region in the wireless frame to be used for the transmission of the request by each of the wireless terminals based on a result of the monitoring of reception and information about priority set to each of the plural wireless terminals, wherein the monitoring monitors the number of collisions of the specific signals received at the specific frequency band and for the specific period of time, and the controlling determines whether to execute the allocation of the transmission region based on the priority according to the number of collisions of the received specific signals; and wherein the priority is based on a contract level of a user possessing each of the wireless terminals.

21. A wireless base station in a wireless communication system having a plurality of wireless terminals and at least one wireless base station communicating with the plural wireless terminals using a wireless frame, the wireless base station comprising:

a monitor that monitors a state of reception in a common transmission region in the wireless frame to be shared by the plural wireless terminals, the common transmission region being used for transmitting each of specific signals from one of the plural wireless terminals for obtaining transmission permission to transmit a request for wireless resource allocation before the transmission of the request to the wireless base station;

a priority information storing unit that stores information about priority set to each of the plural wireless terminals; and a controller that controls allocation of a transmission region in the wireless frame used for the transmission of the request by the wireless terminals based on a result of the monitoring of reception by the monitor and the information about priority in the priority information storing unit, wherein the monitor monitors the number of collisions of the specific signals received at the specific frequency band and for the specific period of time, and the controller determines whether to execute the allocation of the transmission region based on the priority according to the number of collisions of the received specific signals; and wherein the priority is based on a contract level of a user possessing each of the wireless terminals.

* * * * *